United States Patent
Boggs

(10) Patent No.: US 12,351,123 B2
(45) Date of Patent: Jul. 8, 2025

(54) UNIVERSAL VEHICLE PET SAFETY RESTRAINT DEVICE

(71) Applicant: Jared Boggs, Lewis Center, OH (US)

(72) Inventor: Jared Boggs, Lewis Center, OH (US)

( * ) Notice: Subject to any disclaimer, the term of this patent is extended or adjusted under 35 U.S.C. 154(b) by 0 days.

(21) Appl. No.: 18/404,965

(22) Filed: Jan. 5, 2024

(65) Prior Publication Data

US 2024/0227720 A1  Jul. 11, 2024

Related U.S. Application Data

(60) Provisional application No. 63/437,488, filed on Jan. 6, 2023.

(51) Int. Cl.
*B60R 22/10* (2006.01)
*A01K 1/02* (2006.01)

(52) U.S. Cl.
CPC ............ *B60R 22/10* (2013.01); *A01K 1/0272* (2013.01)

(58) Field of Classification Search
CPC ...... B60R 22/10; B60R 22/105; A01K 1/0272
USPC ................................................ 119/797, 771
See application file for complete search history.

(56) References Cited

U.S. PATENT DOCUMENTS

| | | | |
|---|---|---|---|
| 4,243,185 A | 1/1981 | Motonami et al. | |
| 4,319,667 A | 3/1982 | Motonami et al. | |
| 4,552,407 A | 11/1985 | Takada | |
| 4,787,677 A * | 11/1988 | Reighter | B60R 22/14 224/159 |
| 5,507,422 A * | 4/1996 | Shields | A45F 3/12 224/264 |
| 5,864,927 A * | 2/1999 | Liu | A44B 11/06 24/163 R |
| 6,601,540 B1 | 8/2003 | Davis | |
| 8,267,050 B1 * | 9/2012 | Hatcher | A01K 27/004 119/797 |
| 8,281,748 B2 | 10/2012 | Elkins et al. | |
| 8,292,329 B2 | 10/2012 | Singh | |
| 8,739,739 B2 | 6/2014 | Davis | |
| D708,399 S | 7/2014 | Lipscomb | |
| 8,818,465 B1 | 8/2014 | Gorham, Jr. | |
| 9,173,374 B2 | 11/2015 | Hovsepian | |
| 10,189,435 B2 | 1/2019 | Templeton | |
| 10,953,847 B2 * | 3/2021 | Hamilton | B60R 22/202 |
| 2011/0156469 A1 * | 6/2011 | Carpenter | B60R 22/105 297/482 |

* cited by examiner

*Primary Examiner* — James A English
(74) *Attorney, Agent, or Firm* — Standley Law Group LLP; Bryan P. Finneran; Kenny W. Pung

(57) ABSTRACT

A device is provided for securing a pet proximate to a seatbelt in a vehicle. An example of the device includes an apparatus having a rear piece which may be secured relative to a front piece along a length of a seatbelt running between the rear piece and the front piece. The apparatus may be adjusted along a length of a seatbelt. In this example, a strap may link a pet harness to the secured apparatus to prevent and/or reduce the risk of the pet being injured during an accident or heavy braking of the vehicle. The secured pet harness may also allow for some movement of the pet to promote comfort.

20 Claims, 13 Drawing Sheets

UNIVERSAL VEHICLE PET SAFETY RESTRAINT DEVICE

CROSS-REFERENCE TO RELATED APPLICATIONS

This non-provisional patent application claims priority to U.S. Provisional Application Ser. No. 63/437,488, filed on Jan. 6, 2023, the disclosure of which is incorporated by reference as if fully recited herein.

TECHNICAL FIELD

Embodiments of the present disclosure relate to a device for securing a pet proximate to a vehicle seatbelt. In one example embodiment, a rear portion of a seatbelt attachment apparatus is adapted to be immobilized opposite of a front portion of the seatbelt attachment apparatus, and a portion of a seatbelt webbing (also referred to herein as a "seatbelt strap") may be positioned between the rear and front portions of the seatbelt attachment apparatus. The seatbelt attachment apparatus may be secured at any number of different positions along a length of the seatbelt strap. A safety strap may link a pet harness to the seatbelt attachment apparatus to promote both safety and comfort of a pet in a mobile vehicle environment.

BACKGROUND AND SUMMARY OF THE INVENTION

Traditionally, the safety of human vehicle passengers has been promoted by seatbelts, which may be adapted to prevent the human passenger from being thrown substantially forward during a vehicle accident and/or heavy braking of the vehicle due to momentum of the passenger. By way of example and not limitation, in a situation where a passenger is not wearing a seatbelt, momentum of the passenger may cause the passenger to be thrown substantially forward when the vehicle is abruptly halted during a collision, potentially resulting in injury to the passenger. Although seatbelts have been substantially beneficial for protecting human vehicle passengers, seatbelts, without more, have very limited efficiency with promoting both comfort and safety of non-human, animal passengers, including pets such as, by way of example and not limitation, dogs.

The seatbelt itself, without more, may be substantially uncomfortable for the pet, easy for the pet to escape and/or move out of a safe position with respect thereto, apply dangerous force to the pet during an accident and/or a heavy braking situation (e.g., the seatbelt is not designed for non-humans, thus a pet may be susceptible to certain injuries such as limb injuries during a significant vehicle collision when the pet is positioned behind the seatbelt), some combination thereof, or the like. Additionally, many pets weigh too little to activate an inertia locking retractor of the seatbelt during an accident and/or heavy braking situation. However, it is still desirable to secure the pet within the vehicle in some manner, since without any securement, the pet may, by way of example and not limitation, be thrown at, over, under, and/or between forward positioned seats and/or other automobile material during an accident and/or heavy braking situation, interfere with automobile window controls, damage upholstery and/or other material in an automobile (e.g., from climbing on said material), interfere with automobile door and/or seat controls, jump into the footwell (e.g., when looking for crumbs), move outside window openings, interfere with an automobile driver, some combination thereof, or the like.

Certain safety devices for vehicles have been developed to, e.g., reduce certain risks associated with not securing a pet within a vehicle. One known safety device includes a harness adapted to have a seatbelt placed directly therethrough. Another known safety device includes a tether (linked to the pet) and carabiner (linked to the tether), wherein the carabiner connects directly to a seatbelt receptacle (buckle). Yet another known safety device includes a pet carrier adapted to attach to a seatbelt.

Known safety devices for use in vehicles have demonstrated some favorable attributes with respect to pets, such as limited capacity to restrict pet movement, and in some cases, ability to prevent pets from being thrown towards a seat, window and/or windshield during an accident. However, there are major notable issues with known safety devices. By way of example and not limitation, known safety devices may be uncomfortable for the pet, may require a specialized pet harness (separate from a general-purpose pet harness, such as for pet walks), may be insufficient for fully preventing a pet from experiencing dangerous impacts, collisions, or the like during an accident and/or heavy braking situation, some combination thereof, or the like. As a specific example not by way of limitation, with known safety devices involving specialized pet harnesses attachable to seatbelts, the pet may move from an initial position by pulling on the seatbelt, which may cause dangerous slack in the seatbelt preventing the pet from being properly maintained in a safe position during an accident and/or a heavy braking situation. Furthermore, many pets weigh too little to activate an inertia locking retractor of the seatbelt for proper securement of the pet during an accident and/or a heavy braking situation. In a hypothetical situation where a pet is immobilized (e.g., to prevent the pet from causing seatbelt slack), the pet may become uncomfortable and/or stressed as a result of being immobilized. The pet may, by way of example and not limitation, react to the stress/discomfort in a way that is annoying and distracting to human vehicle occupants (e.g., barking, whining, or the like).

As another non-limiting example, known safety devices involving a tether and carabiner connecting directly to a seatbelt receptacle (buckle) may be insufficient for preventing dangerous movement of a pet during an accident, heavy braking situation, or the like. In the aforementioned example, since the pet is linked by tether about a connection point (the receptacle) proximate to a seat bottom, the length of the known tether sufficient to permit the pet to reposition itself (e.g., for comfort) may necessarily yield too large a sphere of motion to ensure safe retention of the pet during an accident, heavy braking situation, or the like. The sphere of motion may further be too large to ensure the pet does not engage in undesirable behaviors (e.g., climbing on other vehicle occupants and/or moving into other vehicle seats). As yet another non-limiting example, known safety devices involving a pet carrier are susceptible to causing pet injury during an accident or heavy braking situation, since, e.g., the pet may be thrown against walls of the carrier. Furthermore, by way of example and not limitation, several known safety devices are more complex than optimal, requiring a significant variety of component parts. Certain known devices may be expensive given their complexity. Additionally, certain component parts of known safety devices may be susceptible to snapping, breaking or otherwise failing during an accident.

The aforementioned shortcomings of known safety devices speak to the need for a pet securement device for use in a vehicle that optimally promotes both pet comfort and the safety of the pet and other vehicle occupants.

In view of this, it is beneficial to have a pet securement device for securing a pet proximate to a vehicle seatbelt, wherein the pet securement device promotes pet safety, while permitting some minimal movement of the pet to promote pet comfort.

An exemplary embodiment of the present invention provides a device adapted to protect a pet during a vehicle accident and/or heavy braking situation. An exemplary embodiment of the present invention also provides a device adapted to restrict a pet from moving to parts of a vehicle in which human occupants of a vehicle do not desire the pet to move to, while permitting a small degree of movement of the pet on a vehicle seat to prevent stress and/or discomfort of the pet.

According to the present invention in one aspect, an exemplary pet securement device includes a seatbelt attachment apparatus adapted to be secured at any number of positions along a length of a seatbelt strap. The exemplary pet securement device may further comprise a safety tether (also referred to herein as "safety strap"). The safety strap may be sized appropriately to retain the pet within a sphere of motion small enough to prevent and/or limit dangerous impacts (e.g., collisions with other material in the automobile) on the pet during an accident and/or heavy braking situation, yet large enough to permit the pet to reposition itself and engage in a small degree of movement (e.g., for pet comfort). The exemplary pet securement device may or may not also comprise a pet harness, including by way of example and not limitation, a general-purpose pet harness, a pet harness with enhanced strength material for withstanding greater forces than a general-purpose pet harness, or the like.

A rear portion of the seatbelt attachment apparatus may be adapted to be immobilized opposite of a front portion of the seatbelt attachment apparatus, and a seatbelt strap may be positioned between the rear and front portions. By way of example and not limitation, the rear portion may be connected to the front portion by way of one or more bolts, fasteners, clips, some combination thereof, or the like. It will be apparent to one of ordinary skill in the art, however, that there may be any number of different materials and/or methods available for connecting the front portion to the rear portion without departing from the scope of the present invention.

An area between the front portion and the rear portion of the seatbelt attachment apparatus through which a portion of the seatbelt strap may be positioned may be reduced to secure the seatbelt attachment apparatus to the seatbelt strap. By way of example and not limitation, when the front and rear portions of the seatbelt attachment apparatus are secured in very close proximity to one another around a seatbelt strap, frictional forces may prevent sliding movement of the seatbelt attachment apparatus. Specifically, the force of friction exerted by the front portion on a first side of the seatbelt strap, combined with the force of friction exerted by the rear portion on a second side of the seatbelt strap opposite of the first side may prevent the seatbelt attachment apparatus from sliding along the length of seatbelt away from its secured position.

The aforementioned area may be reduced by, for example not by way of limitation, tightening one or more bolts, fasteners, clips, some combination thereof, or the like configured to connect each portion of the seatbelt attachment apparatus to one another. Likewise, the aforementioned area may be increased to permit repositioning of the seatbelt attachment apparatus by loosening one or more bolts, fasteners, clips, some combination thereof, or the like configured to connect each portion of the seatbelt attachment apparatus to one another. It will be apparent to one of ordinary skill in the art that there may be any number of different materials and or methods available for adjusting the area between front and rear portions of a seatbelt attachment apparatus without departing from the scope of the present invention. It will also be apparent to one of ordinary skill in the art that component parts of an exemplary seatbelt attachment apparatus are not necessarily limited to only front portion and rear portion pieces, and connecting materials therefor. By way of example and not limitation, one or more accessories, additional support items, some combination thereof, or the like may be introduced to the seatbelt attachment apparatus without departing from the scope of the present invention.

The safety strap may permit the pet harness to be linked to the seatbelt attachment apparatus. At least one aperture of the seatbelt attachment apparatus may permit a portion of the safety strap at a first end thereof to be positioned through the seatbelt attachment apparatus to secure the safety strap thereto. It will be apparent to one of ordinary skill in the art, however, that there may be any number of different methods and/or materials available for securing the first end of the safety strap to the seatbelt attachment apparatus without necessarily departing from the scope of the present invention. A carabiner may be included at a second end of the safety strap opposite of the first end. The carabiner may be configured to connect the safety strap to the pet harness. It will be apparent to one of ordinary skill in the art, however, that a carabiner is not necessarily required, and there may be any number of different materials and/or methods available for attaching the second end of the safety strap to the pet harness without departing from the scope of the present invention. By way of example and not limitation, any number of different clips, buckles, fasteners, knots, some combination thereof, or the like may be employed to secure the second end of the safety strap to the pet harness without departing from the scope of the present invention.

A desired amount of slack in the safety strap may permit a certain degree of movement of the pet away from the seatbelt. By way of example and not limitation, an exemplary safety strap may permit the pet to reposition itself in an automobile seat, stand up in the seat, lay down in the seat, move slightly forward in the seat, face different directions in the seat, some combination thereof, or the like. As a result, an exemplary safety strap may promote pet comfort and desirable pet behavior. Additionally, the seatbelt attachment apparatus together with the safety strap may be configured to restrict the pet from moving beyond a threshold distance from the seatbelt, so as to prevent the pet from, by way of example and not limitation, being thrown into forward facing seats, glass and/or other material during an accident or heavy braking situation, being thrown into the footwell during an accident or heavy braking situation, intentionally jumping into the footwell, moving outside window openings, climbing on dividers, upholstery and/or other automobile material, climbing on other vehicle occupants and/or moving into other vehicle seats, some combination thereof, or the like. With prior art alternatives, movement restriction capacity may be insufficient to prevent the pet from, by way of example and not limitation, being thrown into the footwell, forward facing seats, glass and/or other material during an accident/heavy braking situation, intentionally jumping into the footwell, climbing onto other vehicle occupants and/or moving into other vehicle seats, climbing on dividers, upholstery and/or other automobile material, some combination thereof, or the like.

The safety strap may be configured to not stretch when tensile force is applied thereto. The safety strap may also be configured to withstand significant tensile force (e.g., tensile force resulting from forward momentum of a pet in a linked harness during an accident) without breaking, snapping, or otherwise failing. By way of example and not limitation, during an accident, the safety strap, by way of its engagement with the seatbelt attachment apparatus, may prevent the pet from being thrown outside a predetermined sphere of motion (e.g., beyond the front of the seat where the pet is positioned). A length of seatbelt webbing extending from a locking retractor of the seatbelt may be substantially fixed, preferably with very minimal slack (referred to herein as "locked mode") (e.g., according to a child seat lock mechanism of the seatbelt) before a pet is positioned in the linked harness. Locked mode may be established by pulling out a threshold amount of available seatbelt webbing from the locking retractor to activate a lock (e.g., lock activation may be indicated by a clicking sound once all available webbing is pulled out), and then allowing an amount of seatbelt webbing to retract back through the retractor until a desired, fixed seatbelt webbing length is achieved. Preferably, the length is substantially taut (involves very minimal slack, and preferably no kinks or significant wrinkles), but is still long enough to permit a seatbelt latch plate to be maintained in a buckle. In the case of an accident or a significant braking situation, the seatbelt strap in locked mode may substantially limit movement of the seatbelt attachment apparatus to, e.g., prevent more than a minimal degree of forward movement of the safety strap and harness. Locked mode may be disengaged by releasing the latch plate from the buckle/receptacle.

The seatbelt attachment apparatus may be configured to withstand significant pressure (e.g., pressure resulting from significant tensile force in the safety strap, said tensile force resulting from forward momentum of a pet in a linked harness during an accident) without breaking, becoming disengaged from the seatbelt, or otherwise failing. An exemplary device is capable of withstanding forces caused by an automobile crash occurring at an excess of 30 mph. Certain substantially rigid components of the seatbelt attachment apparatus may be permitted to deflect up to a threshold level to reduce the risk of said components snapping when receiving substantial force (e.g., pressure from the safety strap during an accident). By way of example and not limitation, apertures in the surface of a front portion of an exemplary seatbelt attachment apparatus may promote deflection up to a threshold level of the seatbelt attachment apparatus.

In one example embodiment, the rear portion of the seatbelt attachment apparatus comprises a plurality of ridges configured to be received by corresponding ridges or apertures of the front portion of the seatbelt attachment apparatus. It will be apparent to one of ordinary skill in the art that exemplary seatbelt attachment apparatuses and portions thereof may be configured in any number of different shapes and/or sizes without departing from the scope of the present invention. In one example embodiment, the seatbelt attachment apparatus comprises aluminum. It will be apparent to one of ordinary skill in the art, however, that exemplary seatbelt attachment apparatuses may comprise any different number of materials without departing from the scope of the present invention. It will further be apparent to one of ordinary skill in the art that because an exemplary seatbelt attachment apparatus may be secured at any number of positions along an entire length of a seatbelt strap, any number of different animals of any number of different sizes may be secured proximate to the seatbelt by way of the exemplary seatbelt attachment apparatus. It will also be apparent to one of ordinary skill in the art that exemplary embodiments of the present invention are not necessarily limited to use with any particular animal or any particular group of animals.

With exemplary embodiments of the present invention, a pet may be positioned in front of the seatbelt in order to promote pet comfort and safety. Exemplary pet securement devices may be cost effective to users, due to, by way of example and not limitation, a low number of required component parts and low-cost assembly. Furthermore, since use and adjustment of exemplary pet securement devices preferably involves engaging low complexity component parts (e.g., tightening fasters to secure the seatbelt engagement apparatus; e.g., fastening a carabiner to connect the safety strap to a pet harness), essentially any pet owner may be capable of using/adjusting an exemplary device. Additional advantages will become apparent to those of ordinary skill in the art based on the drawings and detailed description thereof.

BRIEF DESCRIPTION OF THE DRAWINGS

Novel features and advantages of the present invention, in addition to those expressly mentioned herein, will become apparent to those skilled in the art from a reading of the following detailed description in conjunction with the accompanying drawings. The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

FIGS. 1-6 generally illustrate component parts of an exemplary seatbelt attachment apparatus 10 (also referred to herein as "apparatus 10") of an exemplary universal vehicle pet safety restraint device (also referred to herein as "pet securement device"), and FIGS. 7-14 generally illustrate an exemplary pet securement device (including apparatus 10) secured to a seatbelt 56, in accordance with a preferred embodiment of the present invention. The vehicle may be any vehicle, including by way of example and not limitation, an automobile, airplane, boat, or the like.

Figure 1:
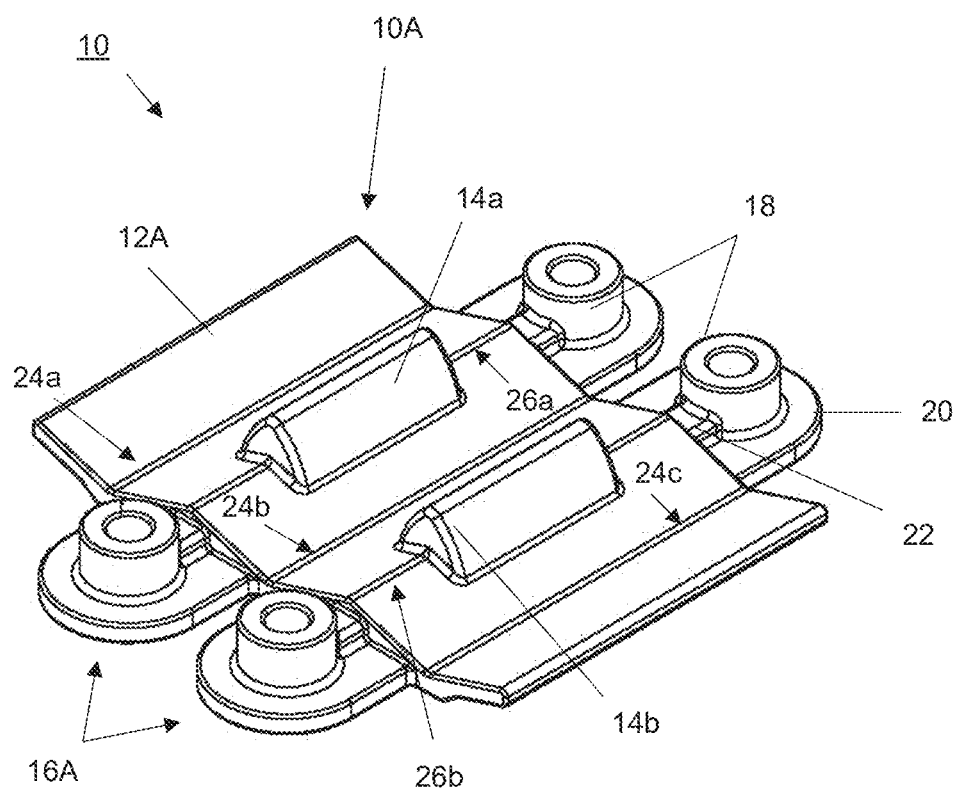
FIG. 1 illustrates a perspective view an exemplary rear portion of a seatbelt attachment apparatus in accordance with an exemplary embodiment of the present invention.
Figure 2:
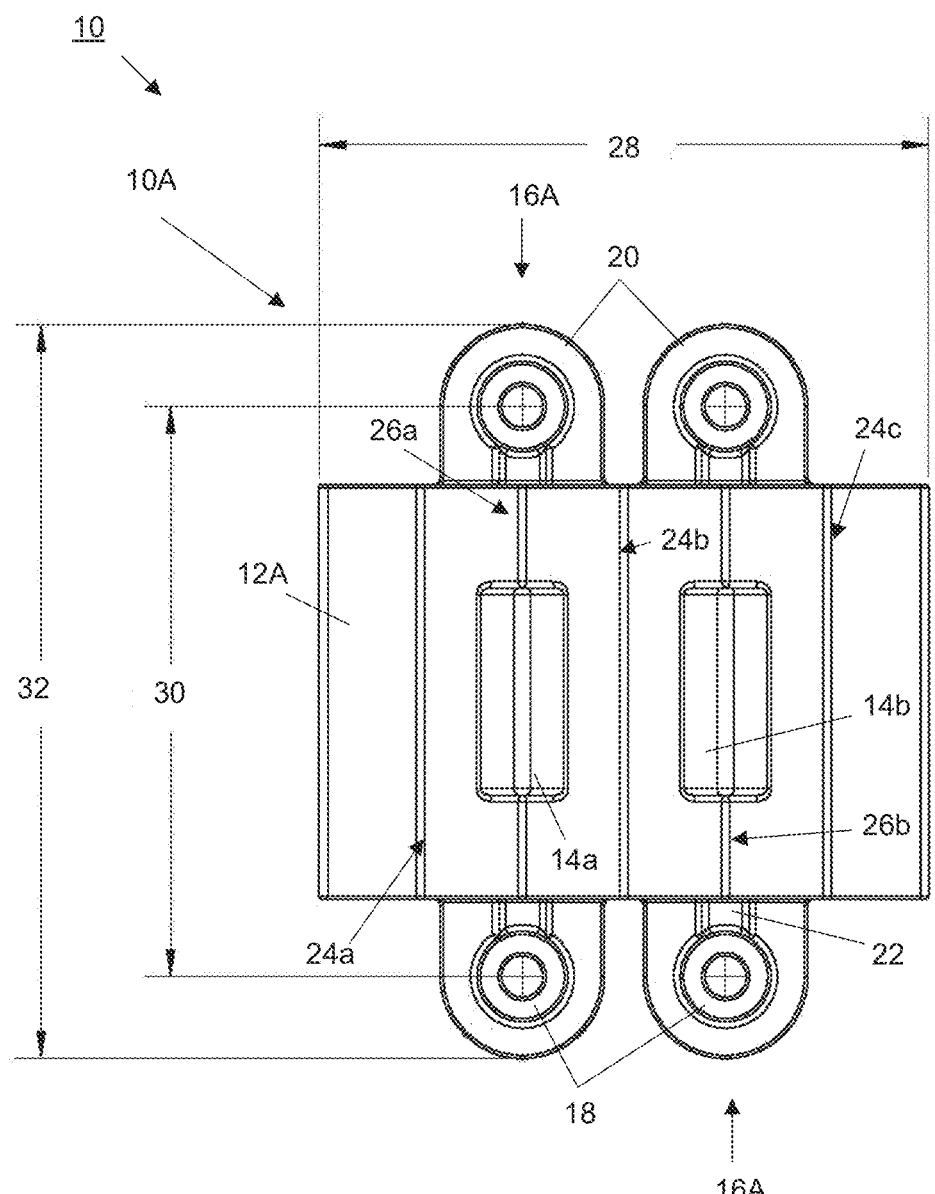
FIG. 2 illustrates a top view of the exemplary rear portion of the seatbelt attachment apparatus of the FIG. 1 embodiment.
Figure 3:
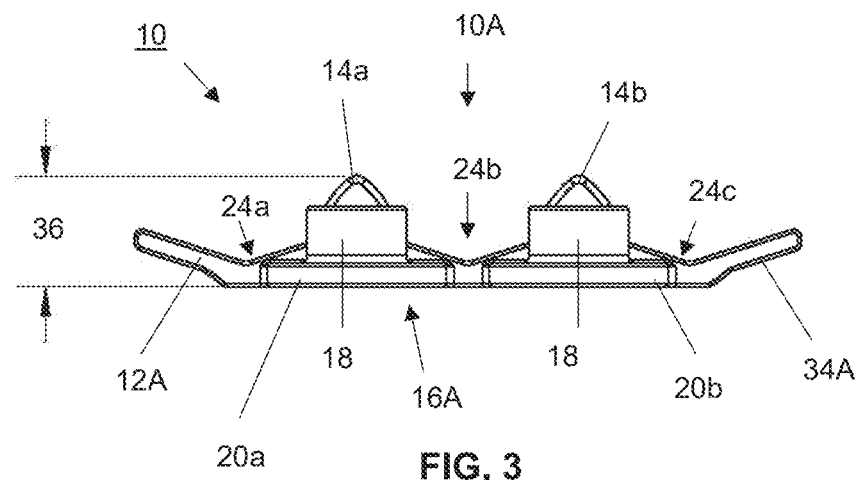
FIG. 3 illustrates a side elevation view of the exemplary rear portion of the seatbelt attachment apparatus of the FIG. 2 embodiment.

Referring now to FIGS. 1-3, a rear portion 10A of an exemplary seatbelt attachment apparatus 10 of an exemplary pet securement device is shown. The rear portion 10A may comprise a body 12A, wherein the body 12A may include any number of different substantially rigid materials, including by way of example and not limitation, aluminum, steel, titanium, some other metal, substantially rigid plastic material, some combination thereof, or the like. In this particular embodiment, the body 12A includes a number of upward ridges 26a-b and downward ridges 24a-c. Referring to FIGS. 1-6 and 8, the ridges 24a-c, 26a-b of the rear portion 10A may be configured to receive or be received by opposing upward 40a-b or downward 42a-c ridges 40, 42 of a front portion 10B of an exemplary seatbelt attachment apparatus 10 to secure a portion of seatbelt webbing 56 therebetween. Apertures 50a-b of the front portion 10B may be configured to receive securing extensions 14a-b of the rear portion 10A to further secure a portion of a seatbelt webbing therebetween.

Figure 8:
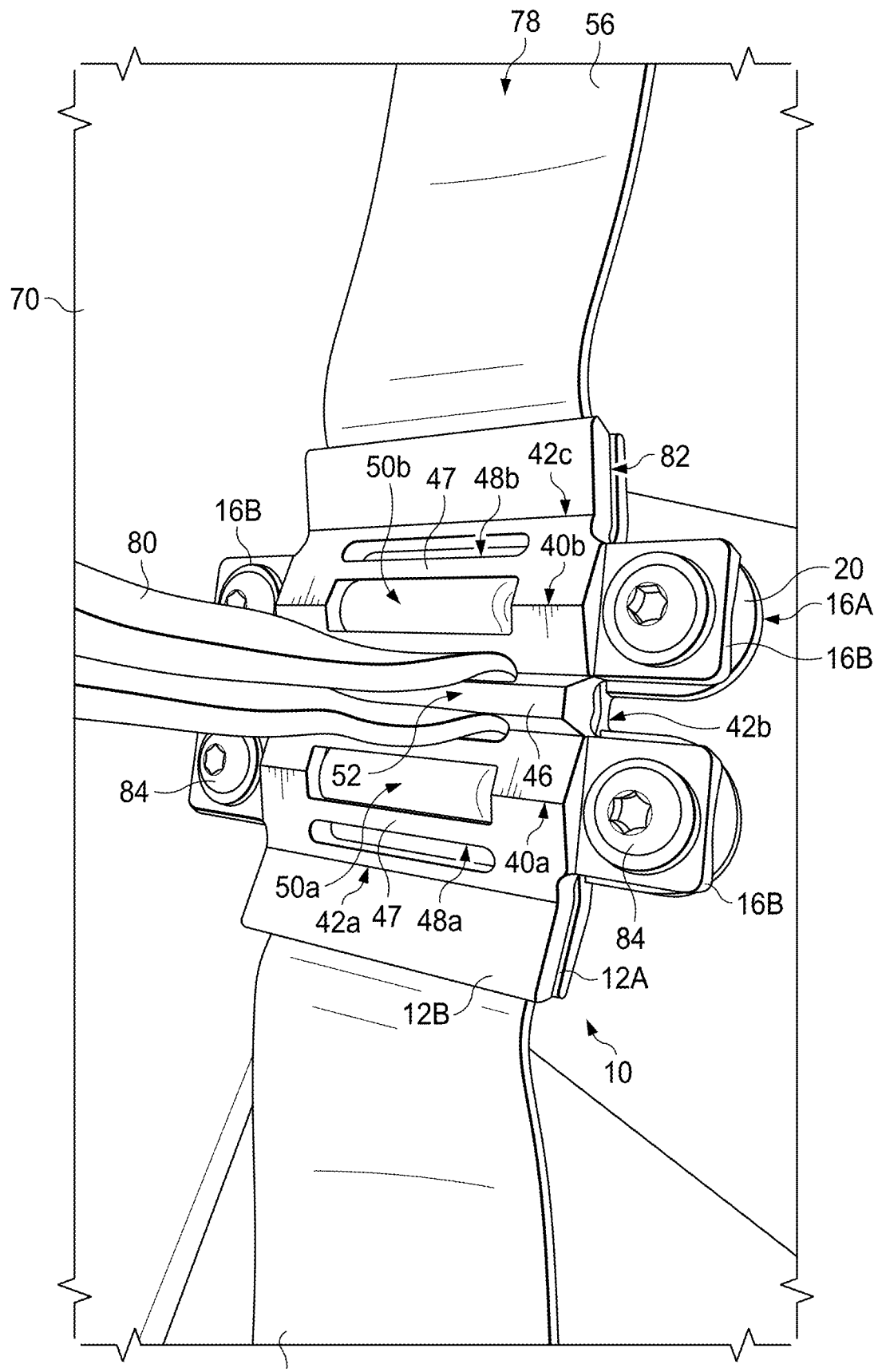
FIG. 8 illustrates a perspective view of the exemplary pet securement device of the FIG. 7 embodiment, secured to a seatbelt.
Figure 9:
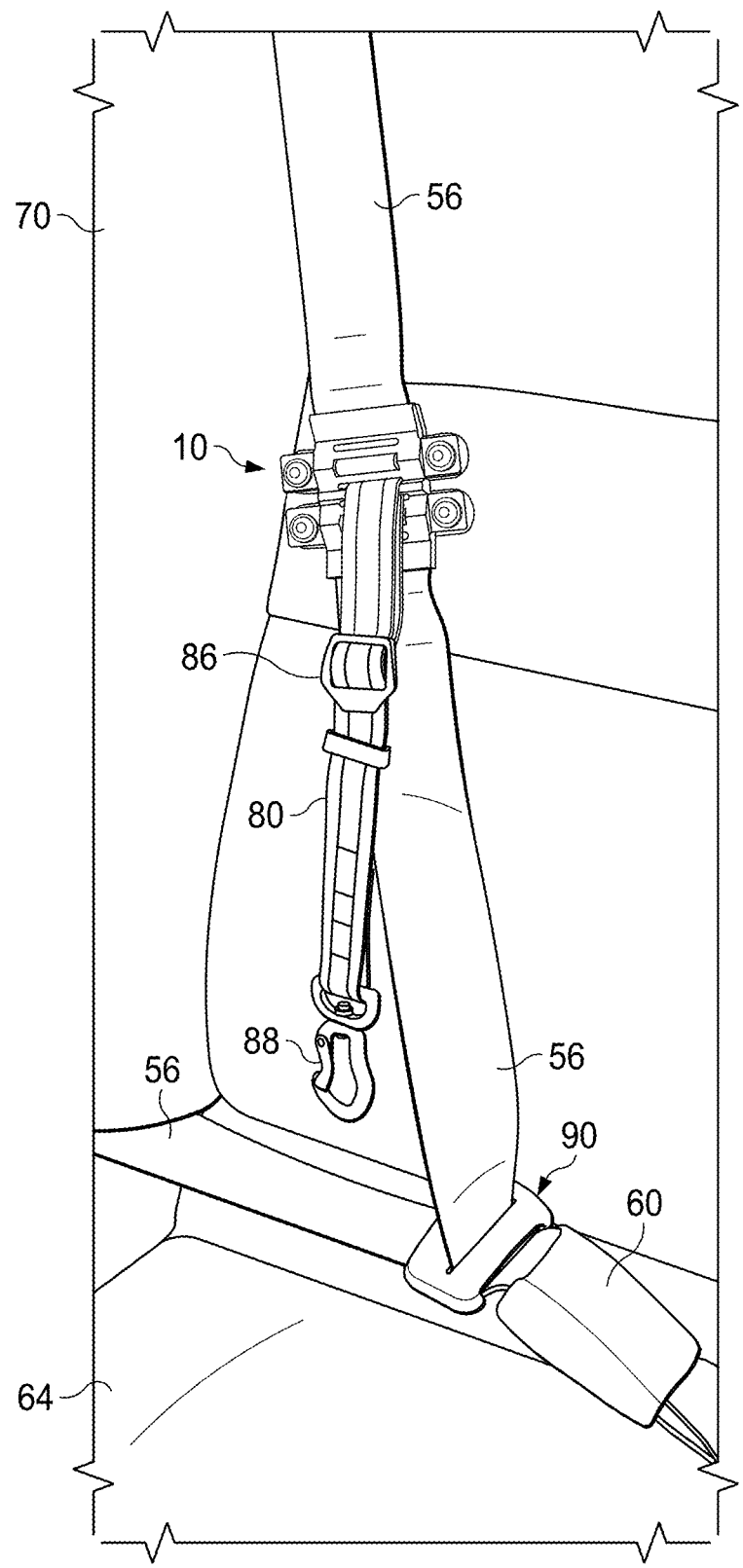
FIG. 9 illustrates another perspective view of the exemplary pet securement device of the FIG. 7 embodiment, secured to a seatbelt.
Figure 10:
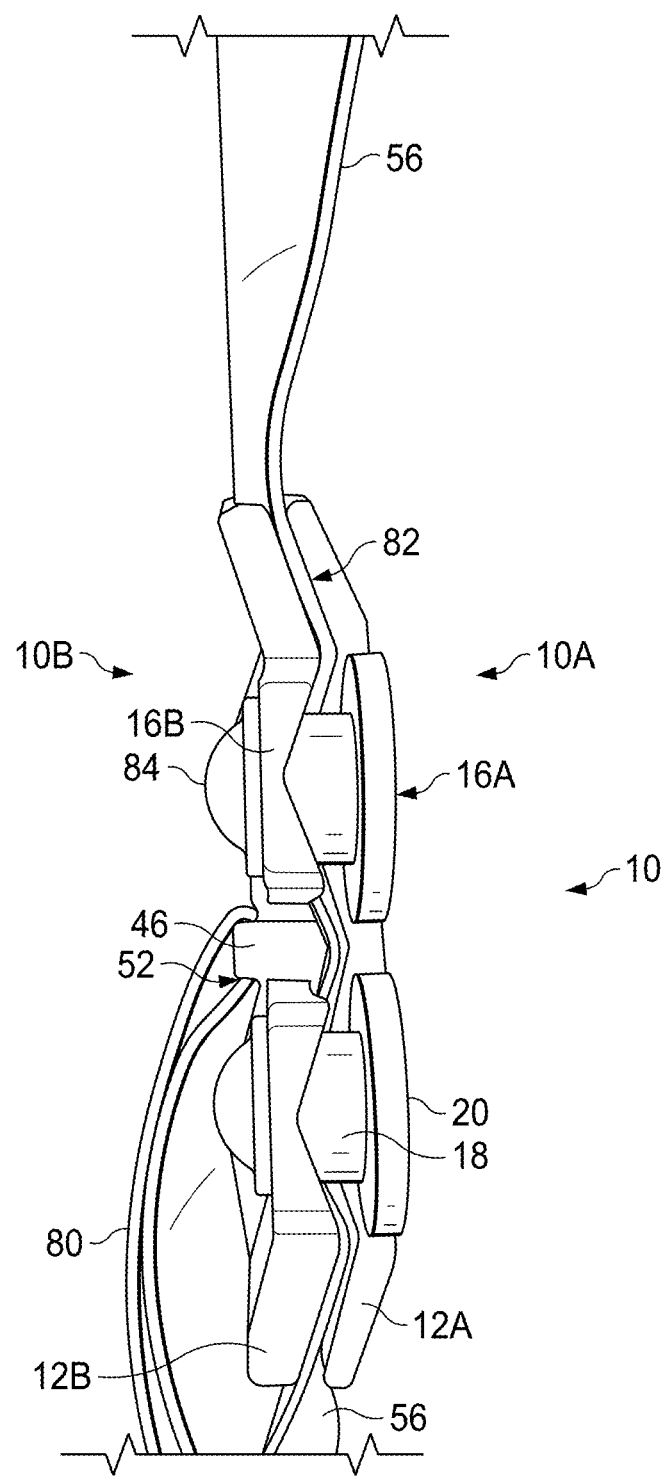
FIG. 10 illustrates yet another perspective view of the exemplary pet securement device of the FIG. 7 embodiment, secured to a seatbelt.

Referring now to FIGS. 1-6, 8 and 10, deflection of the seatbelt strap 56 between multiple opposing ridges (e.g., 24, 26, 40, 42) and securing extensions 14a-b (and apertures 50a-b therefor), each secured with respect to one another, prevents the seatbelt strap 56 from sliding through an area 82 between each the front 10B and rear 10A portions of the seatbelt attachment apparatus 10. In FIGS. 8 and 10, the seatbelt attachment apparatus 10 is in a secured position, where the area 82 between each of the front 10B and rear 10A portions is sufficiently narrow to prevent movement of the seatbelt attachment apparatus 10 along the length of the seatbelt strap 56. The area 82 may be widened to permit repositioning of the seatbelt attachment apparatus 10 to another location along the length of the seatbelt strap 56 (e.g., readjustment may occur for different pets of varying heights and sizes—taller pets may require the seatbelt attachment apparatus 10 to be positioned higher on the seatbelt strap 56) (the size of an exemplary device may also be varied for, e.g., different pets of different sizes). In this particular embodiment, fasteners 84 may be loosened to increase the area 82 for repositioning the seatbelt attachment apparatus 10, and may be tightened to secure the seatbelt attachment apparatus 10 at a particular location.

Figure 6:
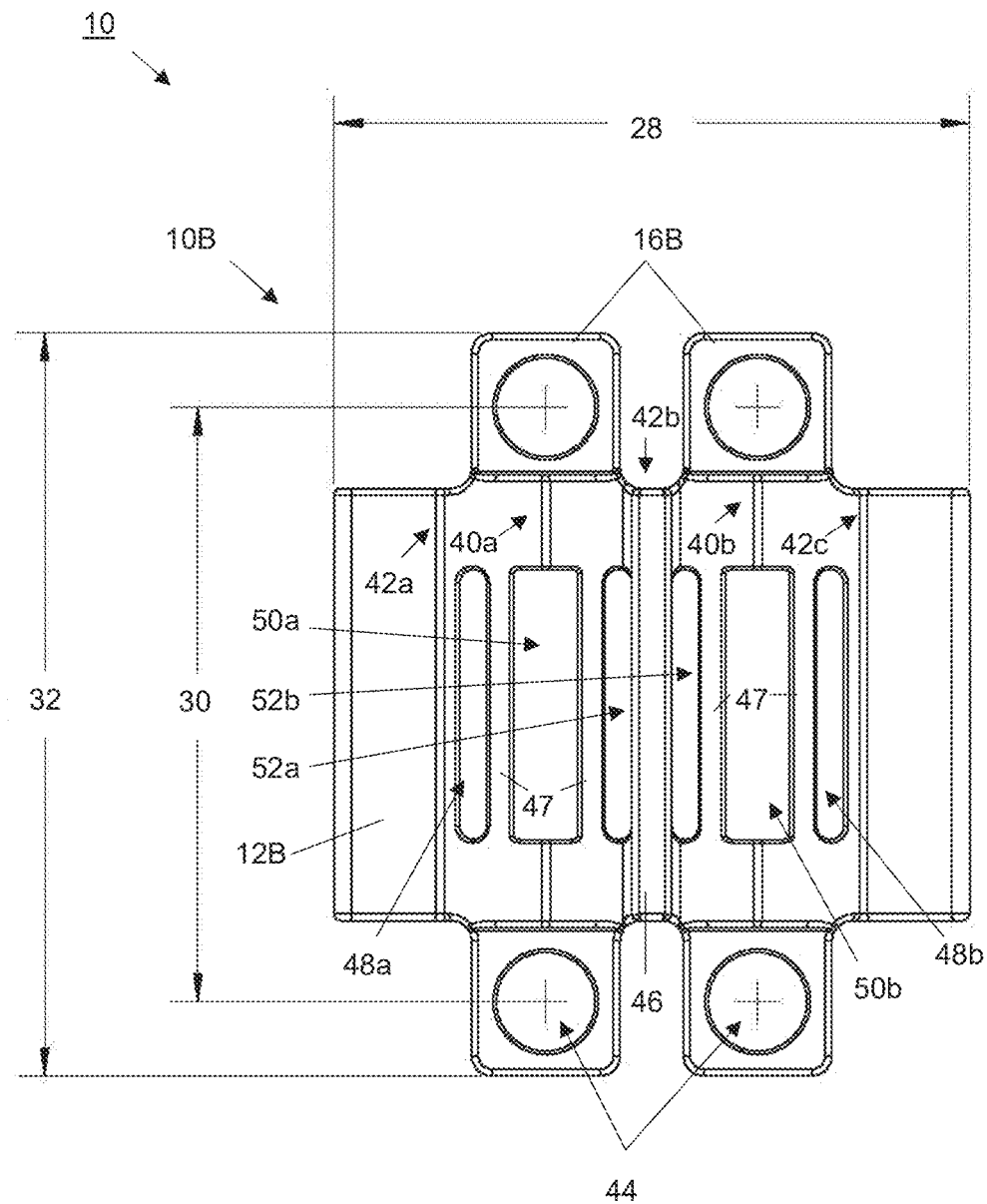
FIG. 6 illustrates a top view of the exemplary front portion of the seatbelt attachment apparatus of the FIG. 5 embodiment.
Figure 7:
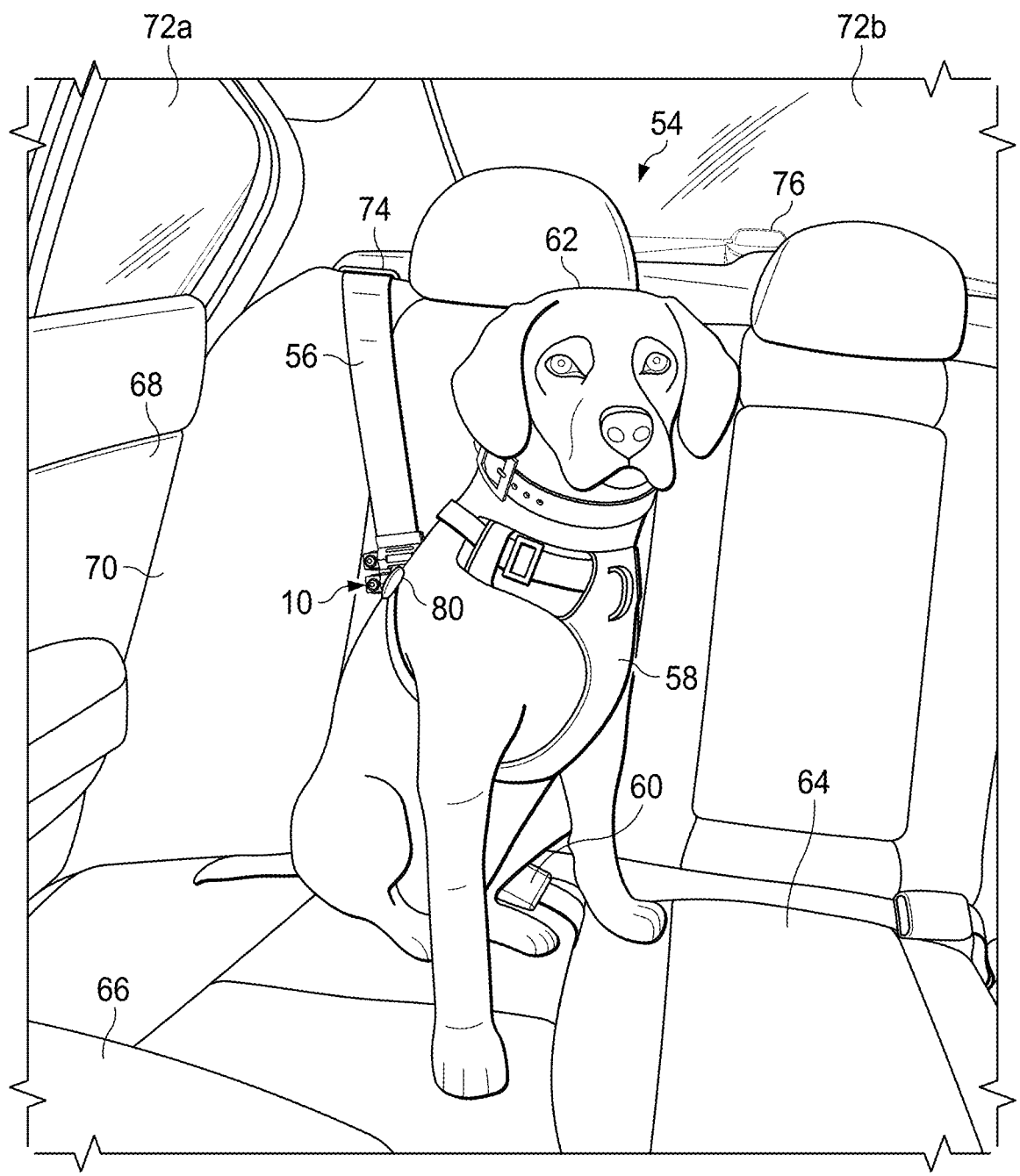
FIG. 7 illustrates a perspective view of an exemplary pet securement device secured to a seatbelt, wherein a safety strap linked to a pet harness is attached to an exemplary seatbelt attachment apparatus.

Referring now to FIG. 7, the seatbelt attachment apparatus 10 may be secured at a central position between a retractor 74 and buckle 60 (e.g., here, the central position is proximate to the height of the pet's 62 torso when the pet is in a sitting or standing position). The seatbelt 56 in this embodiment is substantially locked in place according to an exemplary locked mode. Here, the substantial taut state of the seatbelt 56 combined with the attachment apparatus 10 and safety strap 80 allow the pet 62 the freedom to sit, stand, look out the window, turn around, some combination thereof, or the like while also ensuring the pet 62 is retained in a safe position during an accident, significant braking situation, or the like. Available movements (e.g., sitting, standing, laying down, looking out the window, turning around, some combination thereof, or the like) for the pet 62 may be maximized without increasing the sphere of motion of the pet 62 beyond a safe range by linking the safety strap to the central position. In this particular embodiment, the pet 62 has several inches of freedom of motion. It will be apparent to one of ordinary skill in the art that the particular positions of the seatbelt attachment apparatus 10 in the figures are merely illustrative, and are in no way meant to be exhaustive of the scope of the present invention. Referring back to FIGS. 1-6, 8 and 10, it will also be apparent to one of ordinary skill in the art that the particular apparatus body 12A-B configurations shown are merely illustrative, and an exemplary seatbelt attachment apparatus may include any number of different apparatus body configurations without necessarily departing from the scope of the present invention.

Attachment regions 16A of the rear portion 10A may be configured to engage attachment regions 16B of the front portion 10B to immobilize each portion 10A, 10B with respect to one another. Each attachment region 16A may include a base portion 20, at least one fastener channel 18, and at least one respective beam 22 positioned between each the fastener channel 18 and the main apparatus body 12A. Each beam 22 may promote structural security of the seatbelt attachment apparatus 10. Each fastener channel 18 may be adapted to receive a fastener 84, which may be positioned through each the fastener channel 18 and a fastener aperture 44 of the front portion 10B to connect the front portion 10B to the rear portion 10A of the seatbelt attachment apparatus 10. A fastener 84 may be tightened to restrict repositioning of the apparatus 10, and may be loosened to permit repositioning of the apparatus 10. Each attachment region 16B of the front portion 10B may define each fastener aperture 44. It will be apparent to one of ordinary skill in the art that fasteners are not necessarily required, and any number of different clips, bolts, other connectors, some combination thereof, or the like may be employed without departing from the scope of the present invention. It will also be apparent to one of ordinary skill in the art that the particular configurations of the attachment regions shown are merely illustrative, and are in no way intended to be exhaustive of the scope of the present invention.

Figure 4:
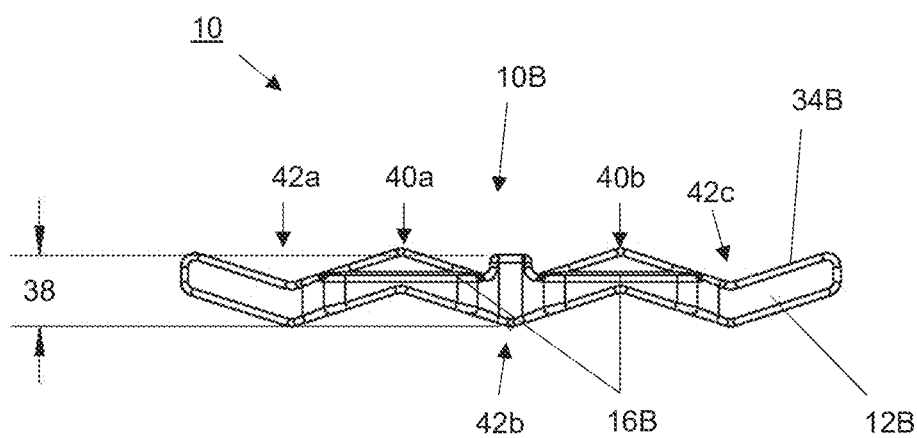
FIG. 4 illustrates a side elevation view of an exemplary front portion of a seatbelt attachment apparatus in accordance with an exemplary embodiment of the present invention.
Figure 5:
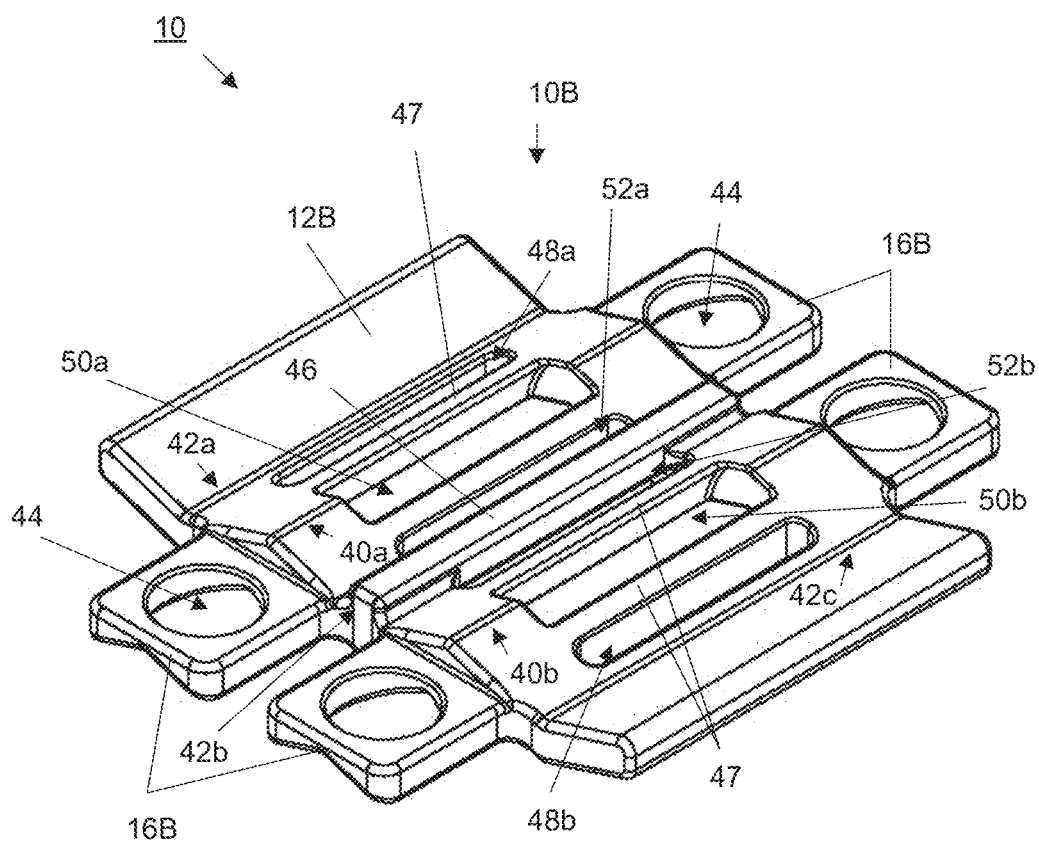
FIG. 5 illustrates a perspective view of the exemplary front portion of the seatbelt attachment apparatus of the FIG. 4 embodiment.

Referring specifically to FIG. 2, each attachment region 16A may be identical to other attachment regions 16A of the rear portion 10A of the apparatus 10, although such is not necessarily required. Here, fastener channels 18 are positioned beyond each of two opposite sides of the main apparatus body 12A a distance 30 from one another. The main apparatus body 12A may extend a distance 28. The attachment regions 16A on one side of the apparatus 10 may extend a distance 32 from the attachment regions 16A on the opposite side of the apparatus 10. It will be apparent to one of ordinary skill in the art that the aforementioned distances and positions may be varied without departing from the scope of the present invention. Referring specifically to FIG. 3, the rear portion 10A may have a particular height 36. Referring specifically to FIG. 4, the front portion 10B may have a particular height 38. It will be apparent to one of ordinary skill in the art that either of the aforementioned heights may be varied without departing from the scope of the present invention. Referring now to both FIGS. 3 and 4, each portion 10A-B of the apparatus 10 may include an outer layer 34A-B configured to promote structural security of the apparatus 10.

Referring now to FIGS. 5-6, 8 and 10, an attachment beam 46 of the front portion 10B may permit a safety strap 80 to be attached to the apparatus 10. Here, the exemplary safety strap 80 is approximately nine inches in length, but it will be apparent to one of ordinary skill in the art that the length of the safety strap may be varied (e.g., to adjust the sphere of motion, which may be varied depending on the size of the pet) (e.g., smaller pets may be provided a smaller safety strap and/or harness) without necessarily departing from the scope of the present invention. In this particular embodiment, a looped first end of the safety strap 80 is positioned through apertures 52a-b to secure the safety strap 80 to the apparatus 10. In this particular embodiment, the attachment beam 46 is adapted to withstand substantial pressure from the safety strap 80, including by way of example and not limitation, pressure caused by forward momentum of a pet during a vehicle accident. It will be apparent to one of ordinary skill in the art that the aforementioned attachment mechanism is not intended to be exhaustive, and there may be any number of different methods or materials available for attaching an exemplary safety strap to an exemplary seatbelt attachment apparatus without departing from the scope of the present invention.

In the embodiment shown, two apertures 48a-b are positioned at opposite sides of the apparatus body 12B. The apertures 48a-b may promote up to a certain amount of deflection of the apparatus 10 to, by way of example and not limitation, increase the amount of pressure the apparatus 10 may withstand without breaking or otherwise failing. Certain beams 47 between aforementioned apertures (e.g., 48a-b, 50a-b, 52a-b) may be configured to apply pressure to a seatbelt webbing 56 to maintain security between the apparatus 10 and the seatbelt 56. Although two end apertures (e.g., 48a-b) are shown in this particular embodiment, it will be apparent to one of ordinary skill in the art that the number, size and shape of seatbelt attachment apparatus apertures may be varied without departing from the scope of the present invention.

Referring specifically to FIG. 6, the apparatus body 12B of the front portion 10B may have a particular length 28. Fastener apertures 44 may be positioned on opposite sides of the apparatus body 12B a particular distance 30 from one another. The attachment regions 16B on one side of the apparatus 10 may extend a distance 32 from the attachment regions 16B on the opposite side of the apparatus 10. It will be apparent to one of ordinary skill in the art that the aforementioned length, distances and positions may be varied without departing from the scope of the present invention.

Referring now to FIGS. 7-14, various non-limiting examples of a secured pet safety device (e.g., 54, 78) are shown. Although here, a seatbelt latch plate 90, buckle 60 and an exemplary locked mode (established using a locking retractor 74) of a seatbelt 56 collectively permit the exemplary device (e.g., 10, 80) to restrict pet movement beyond a threshold distance, it will be apparent to one of ordinary skill in the art that operational mechanisms and specific configurations of seatbelt latch plates, buckles and retractors themselves are beyond the scope of the present invention. Thus, it will be apparent to one of ordinary skill in the art that any number of different seatbelt configurations may be employed without departing from the scope of the present invention. In this particular embodiment, the seatbelt 56 is set to locked mode with respect to the retractor 74, and in the case of an accident or a significant braking situation, the seatbelt strap 56 may substantially limit movement of the seatbelt attachment apparatus 10 to prevent more than a minimal degree of momentum-based forward movement of the pet 62.

Specifically, the locked mode of the seatbelt strap 56 may prevent the safety strap 80 from moving substantially forward during an accident or heavy braking situation. As a result, the pet linked to the safety strap 80 (e.g., by harness 58) may only be permitted to move a limited distance forward (e.g., a few inches, but not beyond the front edge of the seat) during an accident or heavy braking situation. The aforementioned distance may be altered by, for example not by way of limitation, adjustment of the safety strap 80 (e.g., altering length, slack, or the like thereof). By way of example and not limitation, during an accident, the pet harness 58 may be caught by tension of the safety strap 80 secured to the apparatus 10, and prevent the pet 62 from being thrown against a forward seat (e.g., 66). In the aforementioned example, as slack in the safety strap is removed as a result of tensile force being applied thereto (e.g., caused by forward momentum of the pet during an accident and/or heavy breaking event), the pet may be limited to one to three inches of forward movement.

Likewise, where the pet 62 attempts to jump into the footwell 96, through a window opening (e.g., 72a), interfere with a door (e.g., 68) or otherwise move beyond a threshold distance from the seatbelt 56, the pet harness 58 may be caught by tension of the safety strap 80 and be restricted from moving beyond the threshold distance. Preventing the pet 62 from moving beyond a threshold distance from the seatbelt 56 may also protect the pet from broken glass (e.g., from window 72a or rear windshield 72b) in the case of a significant accident. The pet 62 may be restricted to being positioned proximate to the seatbelt 56 above a seat bottom 64 and in front of a seat back 70. It will be apparent to one of ordinary skill in the art that embodiments described herein involving locked mode are not exhaustive of the scope of the present invention. By way of example and not limitation, some pets may be heavy enough to activate an inertia locking retractor of the seatbelt on their own during an accident and/or heavy braking situation without departing from the scope of the present invention.

Figure 11:
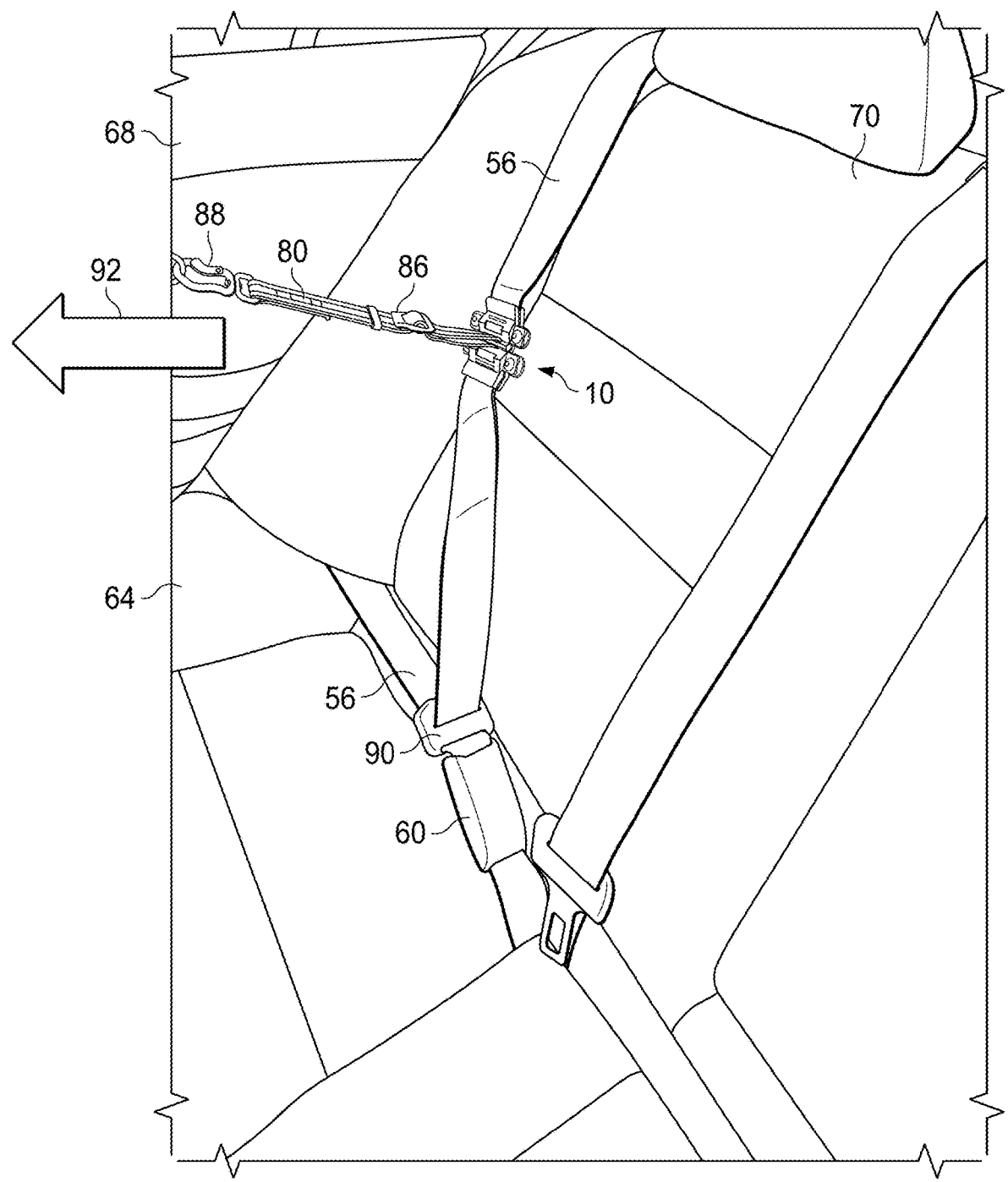
FIG. 11 illustrates application of a tensile force on the safety strap of the FIG. 7 embodiment in accordance with an exemplary locked mode.
Figure 12:
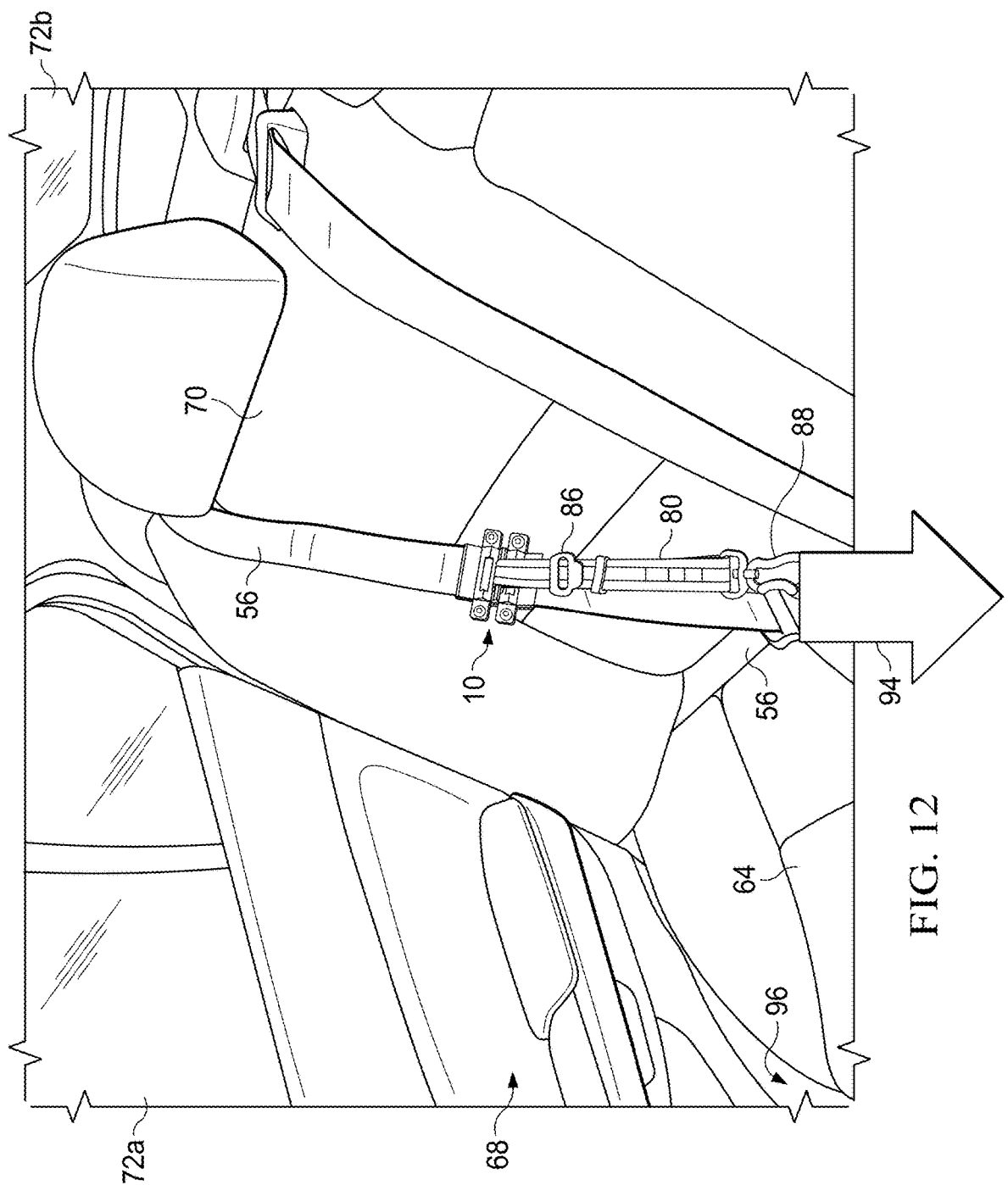
FIG. 12 illustrates application of another tensile force on the safety strap of the FIG. 7 embodiment in accordance with the exemplary locked mode.
Figure 13:
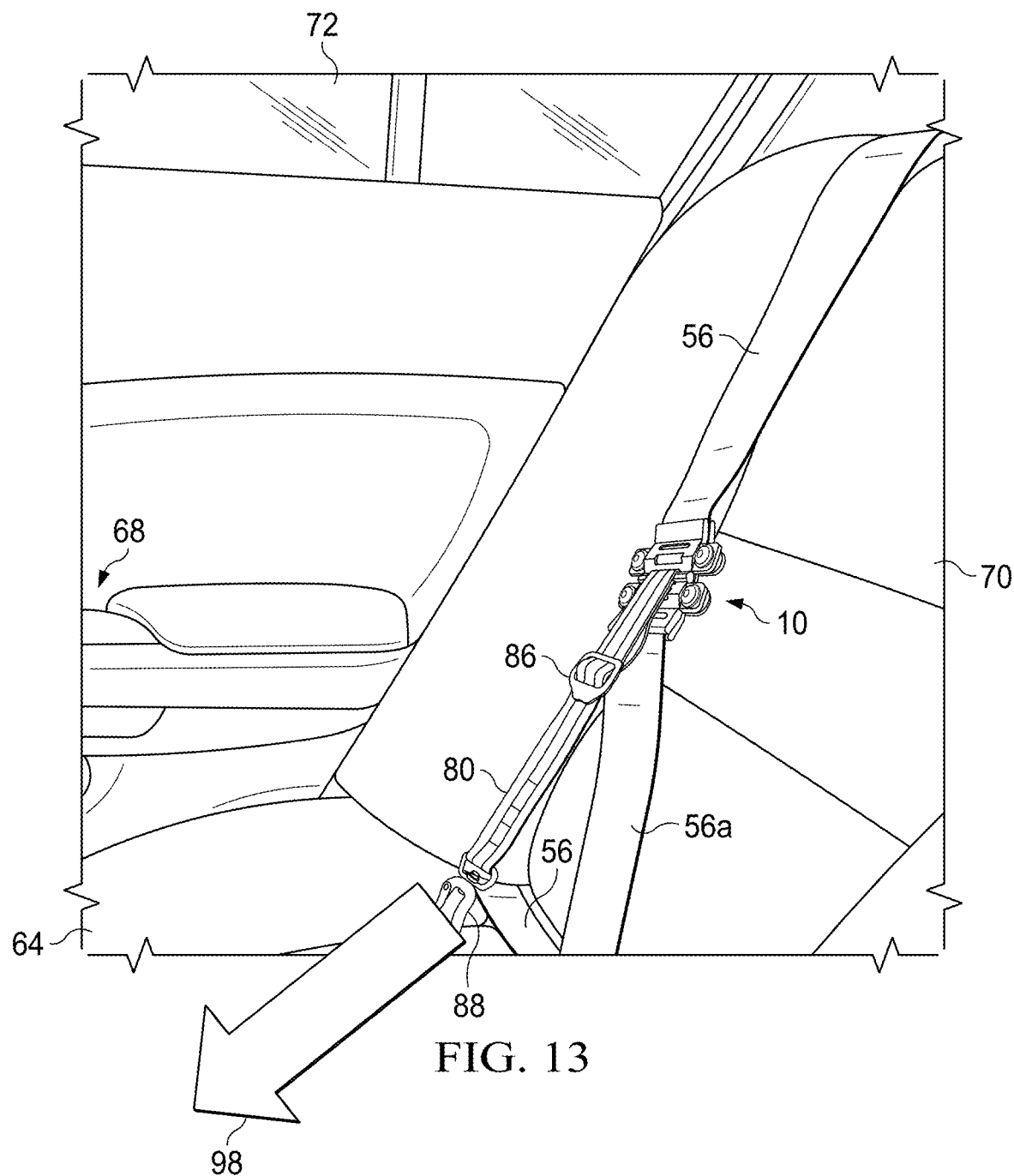
FIG. 13 illustrates application of yet another tensile force on the safety strap of the FIG. 7 embodiment in accordance with the exemplary locked mode.
Figure 14:
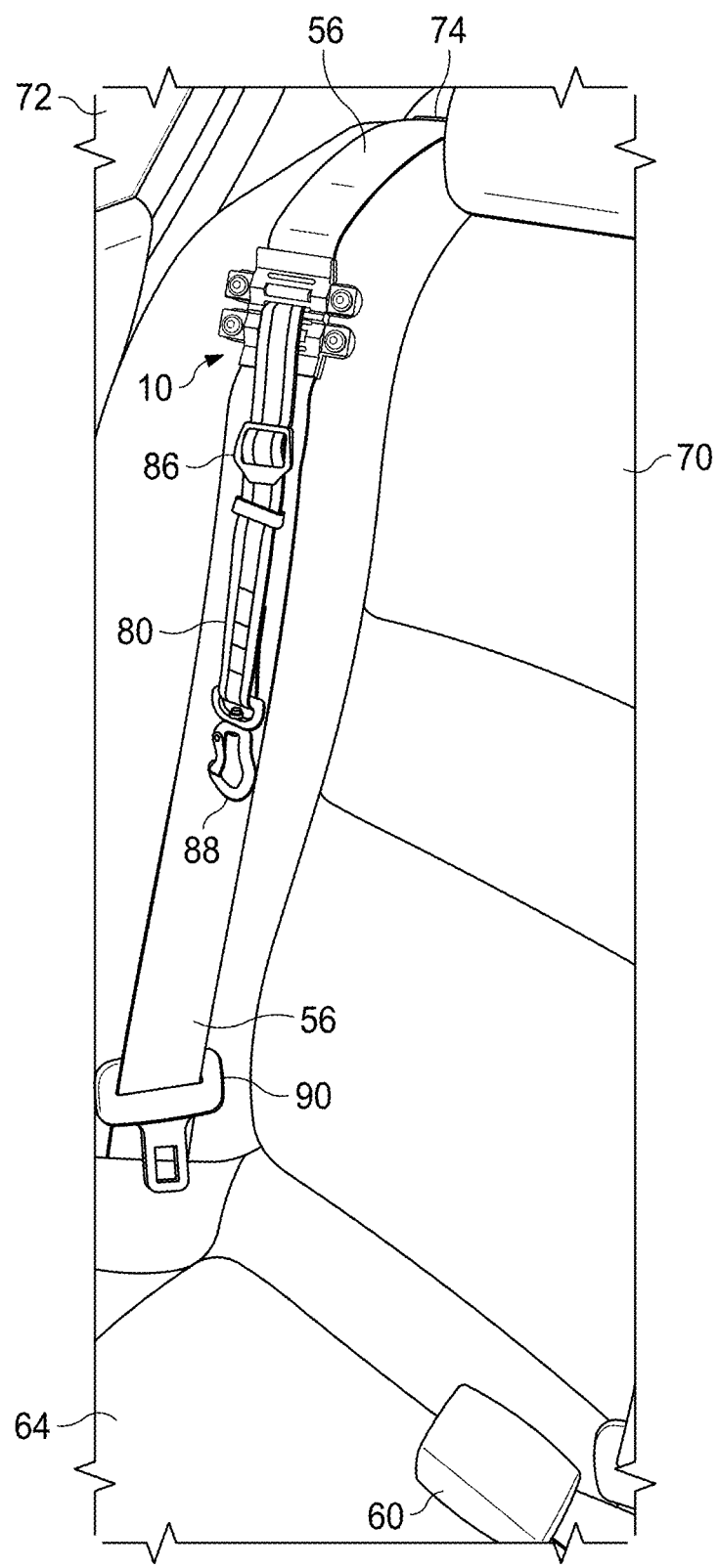
FIG. 14 illustrates yet another perspective view of the exemplary pet securement device of the FIG. 7 embodiment, secured to a seatbelt.

Referring specifically to FIGS. 9 and 11-14, a carabiner 88 may be configured to attach the pet harness to the safety strap 80, although such is not required, and any number of different methods or materials may be employed to connect the safety strap 80 to the pet harness without departing from the scope of the present invention. The length of the safety strap 80 may be adjusted by a slip lock 86, although such is not required, and any number of different methods or materials may be employed for providing adjustment of the length of a safety strap without departing from the scope of the present invention. By way of example and not limitation, safety strap length adjustment may be provided by a cam buckle, clip, or the like. Any number of different tensile forces (e.g., 92, 94, 98) at any number of different magnitudes may be applied to the safety strap 80 without causing the safety strap 80 or apparatus 10 linked thereto to become disengaged. Referring specifically to FIGS. 11-13, where the seatbelt 56 is set to an exemplary locked mode, the safety strap 80 is restricted from extending beyond a certain point when a tensile force (e.g., 92 may correspond the pet looking out the window, 94 may correspond to the pet leaning forward, 98 may correspond to the pet laying down) is applied thereto. Thus, here, the pet is restricted from movement outside a predetermined sphere of movement.

Referring again to FIGS. 9 and 11-14, the safety strap 80 may comprise a length of leash material including by way of example and not limitation, leather, chain, nylon, cotton rope, some combination thereof, or the like. Preferably, safety strap material permits the safety strap to bend and slack, but not stretch while under tension. An example of a pet harness may comprise an amount of durable, lightweight material having apertures for pet limbs, wherein the pet harness material may be configured to be securely closed around a torso of the pet. Pet harness material may include by way of example and not limitation, nylon, other synthetic and durable fabrics, some combination thereof, or the like. Preferably, the pet harness permits at least some movement of the pet, but when tensile force is applied to one or more portions of the pet harness, the pet harness prevents substantial movement of the pet in directions opposing the tensile force. It will be apparent to one of ordinary skill in the art that any number of different materials may be employed to assemble exemplary safety straps and/or pet harnesses without departing from the scope of the present invention. It will also be apparent to one of ordinary skill in the art that an exemplary safety strap may be configured to attach to any number of different known pet harnesses without departing from the scope of the present invention. It will further be apparent to one of ordinary skill in the art that a pet harness is not necessarily a required component of the present invention.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A pet restraint device for attachment to a seatbelt, comprising:
   a first portion, having a body;
   a second portion, having a body;
   wherein said first portion and said second portion are capable of being secured proximate to one another to cause an amount of a seatbelt to be secured therebetween and hold the pet restraint device in a first position relative to said seatbelt;
   wherein said first portion and said second portion are capable of being moved apart from one another to permit said pet restraint device to be repositioned to a second position relative to said seatbelt; and
   wherein said first portion includes an attachment beam extending from a top side of the body thereof, the attachment beam defining an aperture allowing a safety strap to be looped at said top side.

2. The device of claim 1, further comprising said safety strap, wherein said safety strap is configured to extend from the attachment beam to a pet harness.

3. The device of claim 1, wherein said body of said first portion and said body of said second portion each comprise substantially rigid material.

4. The device of claim 3, wherein said substantially rigid material comprises at least one selected from the group of aluminum, steel, titanium, and plastic.

5. The device of claim 1, wherein each of said first portion and said second portion include one or more ridges capable of deflecting a portion of said amount of seatbelt.

6. The device of claim 2, wherein said device is capable of causing the safety strap and the harness to restrict movement of a pet beyond a threshold distance.

7. The device of claim 1, further comprising one or more fasteners configured to permit said first portion and said second portion to be secured proximate to one another.

8. The device of claim 1, wherein said first portion comprises a plurality of attachment regions each configured to engage a corresponding attachment region of said second portion to cause said first portion and said second portion to be secured proximate to one another.

9. The device of claim 8, wherein each attachment region of said second portion includes a base portion and at least one fastener channel, and each attachment region of said first portion includes a fastener aperture.

10. The device of claim 7, wherein said fasteners are capable of being loosened to permit repositioning of said device.

11. The device of claim 9, wherein each attachment region of said first portion is substantially identical to one another, and each attachment region of said second portion is substantially identical to one another.

12. A pet restraint device for attachment to a seatbelt, comprising:
    a rear portion, having a body and at least one protrusion;
    a front portion, having a body and at least one channel adapted to receive said at least one protrusion;
    wherein said front portion and said rear portion are capable of being secured proximate to one another to cause an amount of a seatbelt to be secured therebetween and hold the pet restraint device in a first position relative to said seatbelt;
    wherein said front portion and said rear portion are capable of being moved apart from one another to permit said pet restraint device to be repositioned to a second position relative to said seatbelt; and wherein said front portion includes an attachment beam extending from a top side of the body thereof, the attachment beam defining an aperture allowing a safety strap to be looped at said top side.

13. The device of claim 12, wherein said front portion includes at least two ridges.

14. The device of claim 13, wherein said attachment beam is positioned between two of said at least two ridges.

15. The device of claim 12, wherein said device is capable of withstanding pressure caused by forward momentum of a pet.

16. The device of claim 12, wherein said front portion includes a plurality of apertures capable of promoting deflection of said device.

17. The device of claim 12, wherein said device is configured to permit said safety strap to be adjusted.

18. The device of claim 12, wherein each of said front portion and said rear portion include one or more ridges capable of deflecting a portion of said amount of seatbelt.

19. A method for assembling a pet restraint device for attachment to a seatbelt, comprising:

providing a first portion, having a body;

providing a second portion, having a body;

configuring said first portion and said second portion to be capable of being secured proximate to one another to cause an amount of a seatbelt to be secured therebetween and hold the pet restraint device in a first position relative to said seatbelt;

configuring said first portion and said second portion to be capable of being moved apart from one another to permit said pet restraint device to be repositioned to a second position relative to said seatbelt; and providing an attachment beam at said first portion, said attachment beam extending from a top side of the body of said first portion, and configuring the attachment beam to define an aperture allowing a safety strap to be looped at said top side.

20. The method of claim 19, further comprising positioning said attachment beam between a pair of substantially identical ridges of said first portion.

* * * * *